United States Patent
Schroer et al.

(10) Patent No.: US 6,736,126 B2
(45) Date of Patent: May 18, 2004

(54) GLIDE PLATE OVERLAY AND GLIDE PLATE ASSEMBLY FOR A CUTTING SAW AND RETROFIT METHOD FOR MANUFACTURING SAME

(76) Inventors: Michael G. Schroer, 115 Quaker Dr., Bethlehem, PA (US) 18020; Mark G. Schroer, 7826 Campbell, Kansas City, MO (US) 64131

( * ) Notice: Subject to any disclaimer, the term of this patent is extended or adjusted under 35 U.S.C. 154(b) by 25 days.

(21) Appl. No.: 10/125,140

(22) Filed: Apr. 18, 2002

(65) Prior Publication Data

US 2003/0196648 A1 Oct. 23, 2003

(51) Int. Cl.⁷ ............................................. B28D 1/04
(52) U.S. Cl. ................................... 125/13.01; 125/14
(58) Field of Search ..................... 125/12, 14, 13.01, 125/36; 451/452, 457

(56) References Cited

U.S. PATENT DOCUMENTS

| | | | |
|---|---|---|---|
| 2,996,089 A | * 8/1961 | McCarty ..................... 30/374 |
| 4,903,680 A | * 2/1990 | Chiuminatta et al. .... 125/13.01 |
| 4,928,662 A | 5/1990 | Chiuminatta et al. |
| 4,938,201 A | 7/1990 | Chiuminatta et al. |
| 5,056,499 A | 10/1991 | Chiuminatta et al. |
| 5,086,750 A | 2/1992 | Chiuminatta et al. |
| 5,305,729 A | 4/1994 | Chiuminatta et al. |
| 4,928,662 A | 4/1995 | Chiuminatta et al. |
| 5,429,109 A | 7/1995 | Chiuminatta et al. |
| 5,505,189 A | 4/1996 | Chiuminatta et al. |
| 5,575,271 A | 11/1996 | Chiuminatta et al. |
| 5,579,754 A | 12/1996 | Chiuminatta et al. |
| 5,664,553 A | 9/1997 | Chiuminatta et al. |
| 5,666,939 A | 9/1997 | Chiuminatta et al. |
| 5,689,072 A | 11/1997 | Chiuminatta et al. |
| 5,803,071 A | 9/1998 | Chiuminatta et al. |

OTHER PUBLICATIONS

Michael G. Schroer (EarlyCut Diamond Products) letter to Leon Nigohosian, Jr. dated Jul. 2nd, 2002 in reference to Patent Application Titled "Glide Plate Overlay and Glide Plate Assembly for a Cutting Saw and Retrofit Method for Manufacturing Same", 1 Page.

N–E–D Corporation, ned–kut Diamond Products, Instructions for Shield Protector Installation, 1 page.

* cited by examiner

*Primary Examiner*—Dung Van Nguyen
(74) *Attorney, Agent, or Firm*—Michael Best & Friedrich LLP

(57) ABSTRACT

A glide plate assembly for a cutting saw having a cutting blade, including a glide plate bracket attachable to a cutting saw and having a substantially planar portion with a longitudinal aperture located therein. A glide plate overlay made of a material penetrable by the cutting blade is configured for attachment over the aperture in the glide plate bracket, such that upon attaching the glide plate bracket to the cutting saw with the glide plate overlay attached over the aperture and operating the cutting saw, a slot is formed in the glide plate overlay by the cutting blade. A glide plate overlay for attachment to the underside of a cutting saw having a cutting blade is also provided that includes a substantially planar portion disposed between two mounting portions, the mounting portions being configured to secure and position the glide plate overlay over a cutting slot located on the underside of the cutting saw. A retrofit method is also provided for manufacturing a glide plate assembly for a cutting saw having a cutting blade. The retrofit method includes the steps of providing a skid plate of a concrete cutting saw, the skid plate having a planar portion with a longitudinal cutting slot dimensioned for a cutting blade. A glide plate overlay is provided and attached over the longitudinal cutting slot of the skid plate. The cutting saw is then operated so that a slot is formed in the glide plate overlay by the cutting blade.

20 Claims, 8 Drawing Sheets

GLIDE PLATE OVERLAY AND GLIDE PLATE ASSEMBLY FOR A CUTTING SAW AND RETROFIT METHOD FOR MANUFACTURING SAME

BACKGROUND OF THE INVENTION

This invention relates to cutting saws, and more specifically to saws for cutting concrete.

When concrete is poured it is typically in a watery or flowing state which allows the concrete to be spread evenly over floors. After a period of time, varying with the mixture of the concrete, the temperature, and the moisture availability, the concrete attains a workable plasticity that permits the surface of the concrete to be formed and finished, typically, by troweling, rubbing, or brushing.

After the concrete is finished, it is allowed to stand for a period of time during which the concrete cures to obtain a rock-like hardness. As the concrete cures it undergoes thermal stresses causing the concrete to expand and contract in various manners depending on the shape and thickness of the concrete, and the type of concrete. These thermal stresses can cause cracking. The fully cured and hardened concrete also expands and contracts due to temperature changes with the result that cracks form in the concrete.

It is common practice to provide slots or grooves, commonly referred to as control joints, at predetermined intervals in the concrete. If the grooves extend all the way through the concrete, they can act as an expansion or contraction joint to help prevent cracking of the concrete. If the grooves are only on the surface of the concrete, then the grooves cause the cracks to form along the grooves so that they occur at regular intervals and are not visible. The grooves, but not the cracks, are visible.

One advantage to placing the grooves in the soft concrete is that a weakened plane is provided by the groove and that weakened plane is now installed before the concrete starts to cure and shrink. The concrete slab will typically seek out the weakened plane to crack in, if the plane is prematurely there. Although these grooves can be provided in the wet concrete just after it is poured by forming or grooving a slot with a grooving trowel, manually grooving the freshly poured concrete is impractical or very inconvenient and expensive for very large slabs of concrete.

For such large slabs, cutting saws have been provided for cutting finished concrete while it is in its "green" state before the concrete attains its rock like hardness and, preferably, before the concrete has shrunk sufficiently to cause cracking along planes other than those planes defined by the cut grooves. These conventional concrete saws commonly have a base plate on which are mounted two wheels and a skid plate, each of which contacts the concrete to provide a three point support on the concrete. A motor is pivotally mounted on the base plate and drives a circular saw blade that extends through a slot in the platform, and through a corresponding slot in the skid plate, in order to project into and cut the concrete below the skid plate.

The skid plate is a slotted metal sheet, typically made of steel, that skids along the surface of the concrete and acts as blade guide that applies a downward pressure as the cutting saw passes through the concrete, preferably with an upward cutting motion. During operation, however, the slotted area in the metal sheet, which widens due to wear, degrades the quality of the cut achieved by the cutting saw. When the quality of the cut made by the cutting saw is no longer acceptable, the skid plate is commonly discarded and replaced with a new skid plate.

Thus, the use of conventional skid plates leads to frequent repair of these component parts which is both costly from the standpoint of replacement parts, labor intensive maintenance, and lost production due to downtime. Moreover, the practice of using skid plates is wasteful in that they are disposed of once they are worn.

The foregoing illustrates limitations known to exist in present cutting saws. Thus it is apparent that it would be advantageous to provide an alternative directed to overcoming one or more of the limitations set forth above. Accordingly, an alternative glide plate overlay and glide plate assembly for a cutting saw assembly are provided including the features more fully disclosed hereinafter.

SUMMARY OF THE INVENTION

A glide plate assembly is provided for a cutting saw having a cutting blade, including a glide plate bracket attachable to a cutting saw and having a substantially planar portion with a longitudinal aperture located therein. A glide plate overlay made of a material penetrable by the cutting blade is configured for attachment over the aperture in the glide plate bracket, such that upon attaching the glide plate bracket to the cutting saw with the glide plate overlay attached over the aperture and operating the cutting saw, a slot is formed in the glide plate overlay by the cutting blade. A glide plate overlay for attachment to the underside of a cutting saw having a cutting blade is also provided that includes a substantially planar portion disposed between two mounting portions, the mounting portions being configured to secure and position the glide plate overlay over a cutting slot located on the underside of the cutting saw.

A retrofit method is also provided for manufacturing a glide plate assembly for a cutting saw having a cutting blade. The retrofit method includes the steps of providing a skid plate of a concrete cutting saw, the skid plate having a planar portion with a longitudinal cutting slot dimensioned for a cutting blade. A glide plate overlay is provided and attached over the longitudinal cutting slot of the skid plate. The cutting saw is then operated so that a slot is formed in the glide plate overlay by the cutting blade.

The foregoing and other aspects will become apparent from the following detailed description of the invention when considered in conjunction with accompanying drawing figures.

DETAILED DESCRIPTION OF THE INVENTION

Figure 1:
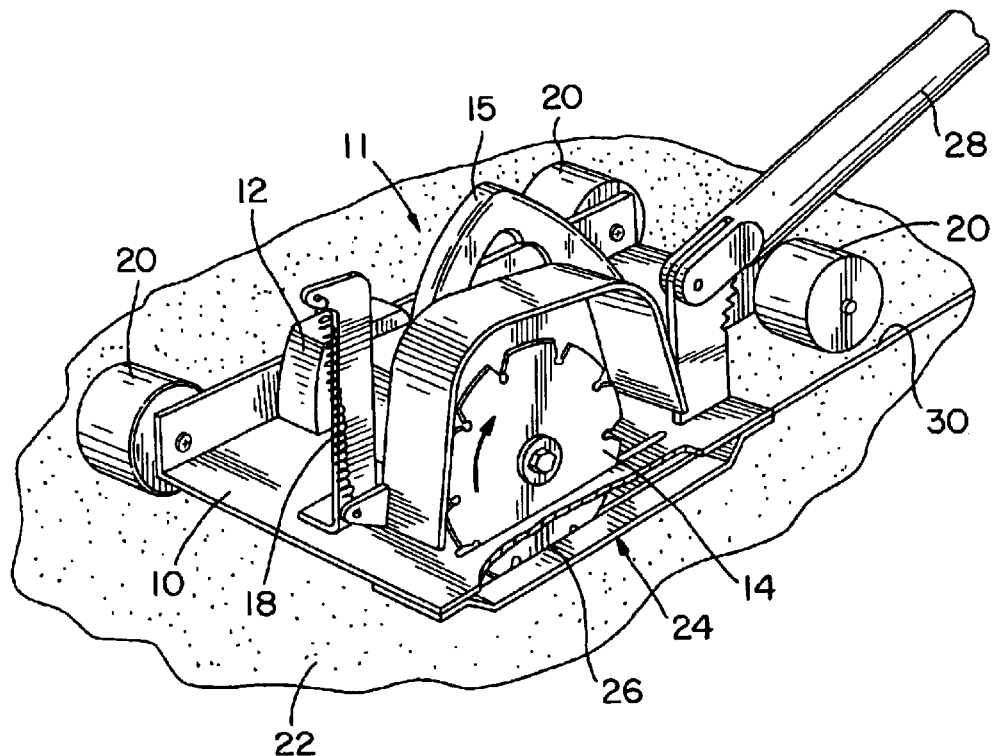
FIG. 1 is an elevated perspective view of a conventional cutting saw being operated in the middle of a slab of concrete.

The invention is best understood by reference to the accompanying drawings in which like reference numbers refer to like parts. It is emphasized that, according to common practice, the various dimensions of the component parts as shown in the drawings are not to scale and have been enlarged for clarity.

Figure 2:
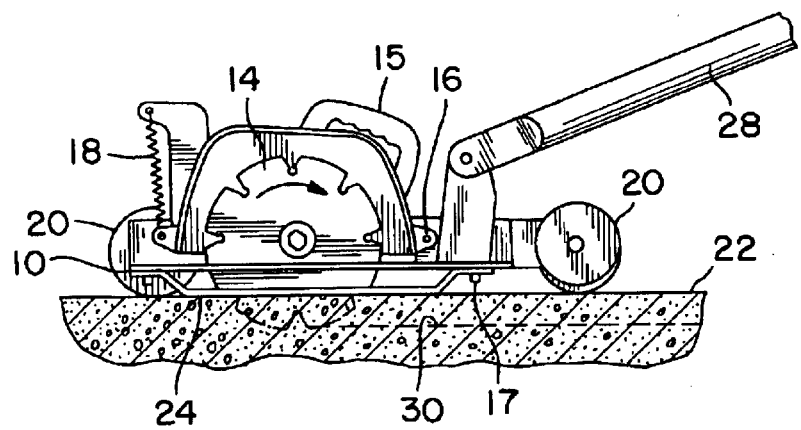
FIG. 2 is a side view of the saw in FIG. 1 showing the motor and blade in a lowered cutting position.

Referring to FIGS. 1, 2, 3, and 4, a cutting saw 11 for cutting uncured concrete is shown having conventional features as are described briefly below. Cutting saw 11 comprises a support plate 10 on which is mounted a motor 12 which drives a rotating cutting blade 14. As shown in FIG. 2, motor 12 and cutting blade 14 are pivotally mounted to support plate 10 by a pivot 16. A resilient member such as spring 18 urges the motor 12 and blade 14 away from support plate 10.

A plurality of wheels 20 support the saw 11 on concrete 22 and allow the cutting saw 11 to roll across its surface. A skid plate 24 is removably connected by fasteners such as screws 17 to the support plate 10, and depends sufficiently to slide on the surface of the concrete 22. The skid plate 24 has a longitudinal slot 26 extending through it, with the blade 14 extending through the slot 26 to cut the concrete 22. A handle 28 connects to the support 10 to allow the saw 11 to be pushed out onto, guided across, and withdrawn from a large slab of concrete. Referring to FIGS. 1 and 2, an additional handle 15 is attached to motor 12. The handle 15 can be grasped by a person in order to carry the cutting saw 11 and, also, to pivot the cutting saw 11 on pivot 16 in order to insert and retract cutting blade 14 from concrete 22.

The cutting blade 14 typically rotates in an up-cut direction to cut grooves 30 in the concrete 22, with the spring 18 and pivot 16 allowing the blade 14 to move out of and float over the surface of the concrete 22 when rocks or aggregate are encountered by the blade 14.

Figure 3:
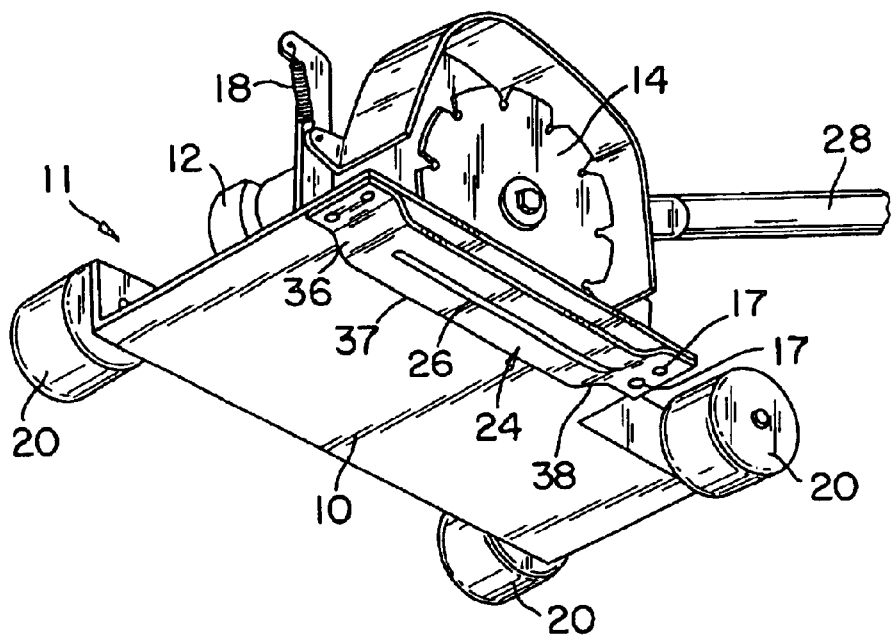
FIG. 3 is a lower perspective view of the saw in FIG. 1 showing the motor and blade in a raised position.

Referring to FIGS. 2 and 3, the skid plate 24 is a generally rectangular strip of metal having rounded ends 36 and 38 between which is a flat piece 37. The flat piece 37 is generally parallel to the support plate 10. The flat piece 37 contacts the surface of concrete 22 in order to help support the weight of the cutting saw 11. The area of the skid plate 24 in contact with the concrete 22, and the area of the wheels 20 which also help support the weight of cutting saw 11, are all sized to provide a large enough area to distribute the weight of the cutting saw 11 without detrimentally marking or substantially damaging the surface finish on the soft concrete 22 which is being cut. The rounded ends 36 and 38 of skid plate 24 prevent gouging the soft surface of concrete 22 as the cutting saw 11 cuts the concrete 22.

The slot 26 is generally rectangular in shape, and is placed in the flat piece 37 of skid plate 24. The spacing between the cutting blade 14 and the adjacent sides of the slot 26 in skid plate 24 is controlled to provide an acceptable surface finish on the surface of concrete 22 adjacent the sides of groove 30. The quality of the groove cut in concrete 22 is also affected by the size of the slot 26 with respect to the portion of the cutting blade 14 extending through that slot. The force exerted on the concrete 22 by skid plate 24 helps to support the surface of the concrete 22 immediately adjacent the groove 30 which is being cut. If the spacing between the sides of the cutting blade 14 and the slot 26 is too great, then the edges of the cut groove 30 will become rough and uneven. It is also possible that spalling, chipping, or surface cracking immediately adjacent the edges of the groove will occur. It is preferred to have the skid plate 24 support the concrete 22 immediately adjacent the groove being cut by the blade 14.

Figure 4:
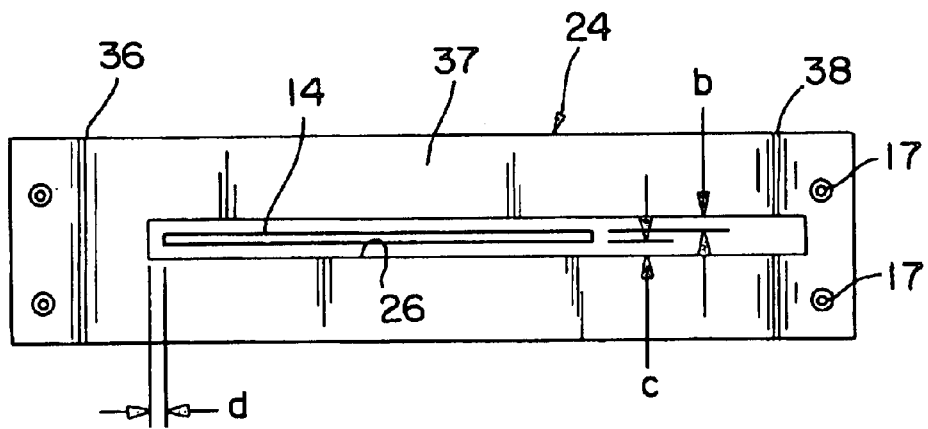
FIG. 4 is a bottom view of a saw blade and slot in the skid plate of the conventional saw of FIG. 1.

To provide the best surface finish adjacent the cut groove 30, it is preferred that in skid plates 24 for conventional cutting saws 11 the spacings b, c, and d shown in FIG. 4 between the sides of cutting blade 14 and the sides of slot 26 in skid plate 24 be as close as possible to zero, without binding or seizing the cutting blade 14. In practice, however, slot 26 is preformed and typically has sides which are initially spaced a finite distance from the sides of the cutting blade 14 in order to prevent binding of the rotating cutting blade 14. Thus, from the time a skid plate 24 is installed, a space is provided between the sides of slot 26 and the rotating cutting blade 14. Moreover, during operation of the cutting saw 11, as the cutting blade 14 and the sides of slot 26 wear, a larger space will naturally develop between the cutting blade 14 and the slot 26 causing an attendant degradation in quality of cut groove 30.

Moreover, because the skid plate 24 in conventional cutting saws 11 is typically made of metal, the sliding surface of the skid plate 24 often becomes abraded as it slides across the surface of the green concrete 22 being cut. As a result, the abraded surface of a worn skid plate provides a higher coefficient of friction that leads to further abrasion of the skid plate and a poor surface quality finish of the concrete 22 being cut.

According to the present invention, a glide plate overlay and a glide plate assembly for a cutting saw are provided. A retrofit method is for manufacturing a glide plate assembly from a conventional concrete cutting saw skid plate is also provided.

Figure 19:
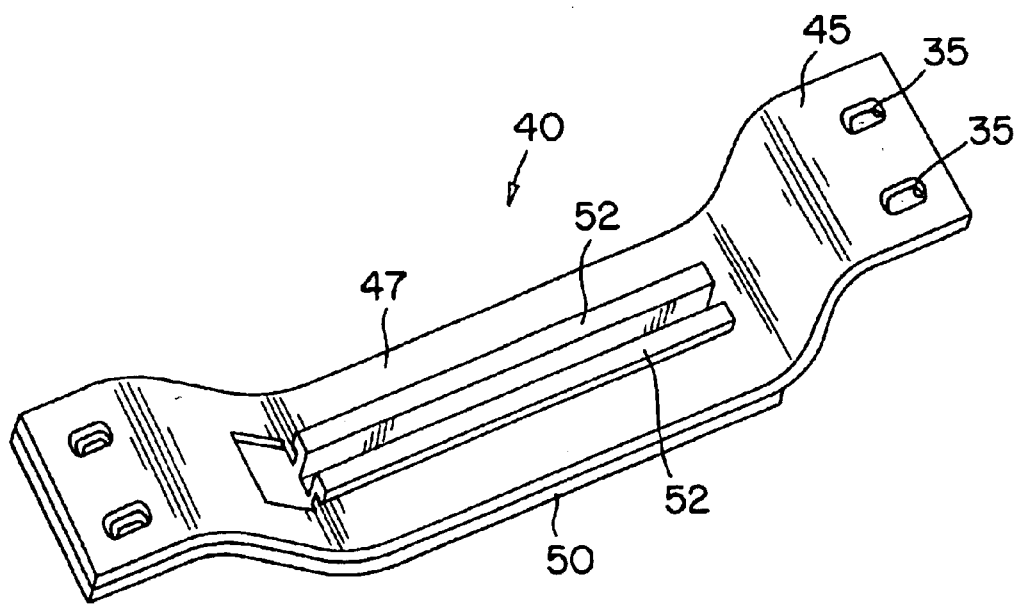
FIG. 19 is an elevated perspective view of an assembled glide plate assembly including the glide plate b racket of FIG. 6 and the glide plate overlay of FIG. 7.

Shown in FIG. 19 is a glide plate assembly 40 for a cutting saw having a cutting blade. The component parts of glide plate assembly 40 are shown in FIGS. 5–10 and include a glide plate bracket 45 having a substantially planar portion 47 with a longitudinal aperture 49 located therein. The glide plate bracket 45 is attachable to a cutting saw such as by screws that pass through mounting holes 35 located in two mounting portions 46 and 48 attached to planar portion 47. The two mounting portions 46, 48, preferably, include curved portions (shown in FIGS. 5 and 6) from which the substantially planar portion 47 depends.

Figure 7:
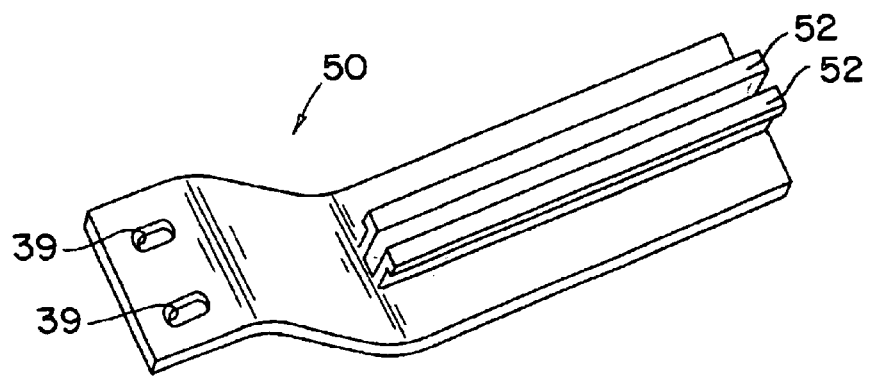
FIG. 7 is an elevated perspective view of a glide plate overlay according to one embodiment of the present invention.
Figure 8:
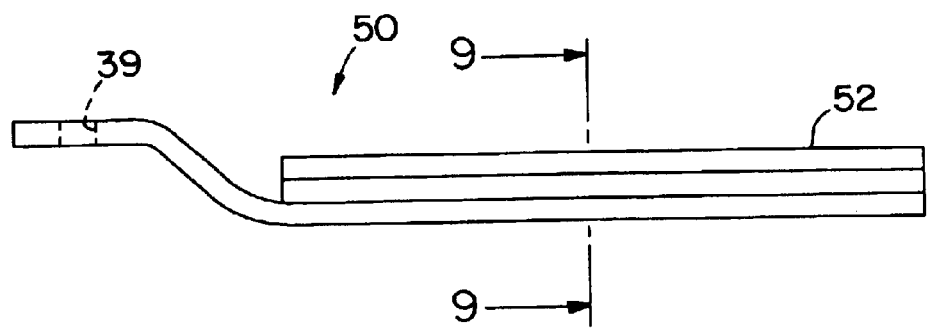
FIG. 8 is a side elevational view of the glide plate overlay of FIG. 7.
Figure 9:
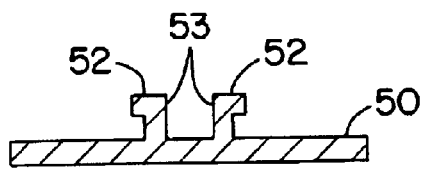
FIG. 9 is a sectional view taken along the sectional line "9—9" in FIG. 8.

Shown in FIG. 7 is a glide plate overlay 50 made of a material penetrable by the cutting blade and configured for attachment over the aperture 49 in the glide plate bracket 45. Glide plate overlay 50 has a wear surface and an attachment surface, the attachment surface comprising at least one inner flange configured for attachment to the longitudinal aperture 49 of glide plate bracket 45. The at least one inner flange, according to one embodiment of the present invention, are two outwardly-facing longitudinal flanges 52 shown in FIGS. 7–9 that are configured to slide into and engage the longitudinal aperture 49 of the glide plate bracket 45. Preferably, the two-outwardly-facing longitudinal flanges are spaced a sufficient distance to form a channel 53 in which the cutting blade can move before reaching the surface to be cut. Preferably, at least one end of glide plate overlay 50 (i.e., the leading end of the glide plate overlay to be moved across the concrete) is curved and contains locking holes 39 that fit over the heads of mounting screws located in mounting holes 35.

Figure 5:
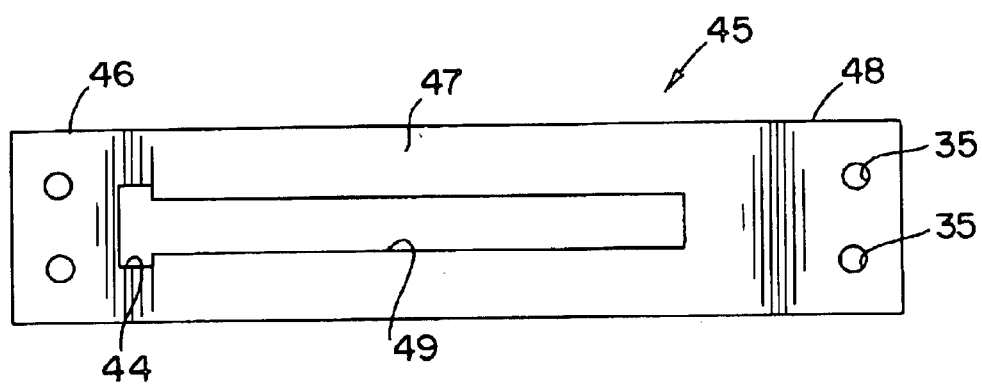
FIG. 5 is a top view of a glide plate bracket according to one embodiment of the present invention.
Figure 6:
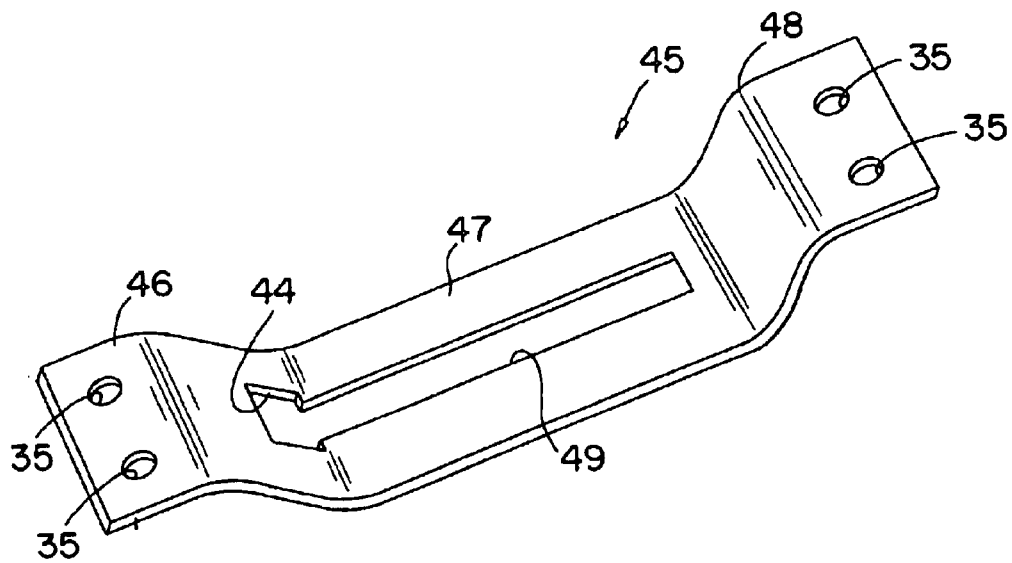
FIG. 6 is an elevated perspective view of the glide plate bracket of FIG. 5.
Figure 10:
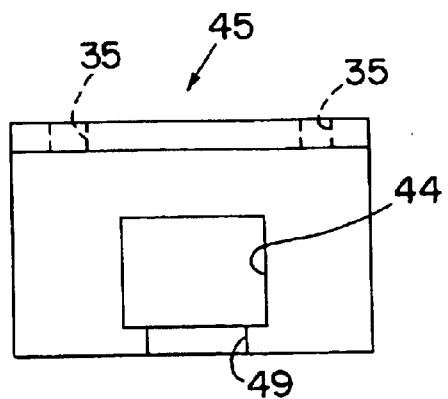
FIG. 10 is a front view of the glide plate bracket of FIGS. 5 and 6.

The substantially planar portion 47 of glide plate assembly 40 is spaced a distance sufficient to place the glide plate overlay 50 covering the substantially planar portion in contact with a concrete surface to be cut by the cutting saw. As shown in FIGS. 5, 6, and 10, one of the mounting portions includes an aperture 44 configured to permit the outwardly facing longitudinal flanges 52 to be inserted into the longitudinal aperture 49 and slide along the substantially planar portion to produce the glide plate assembly 40 shown in FIG. 19.

Upon attaching glide plate bracket 45 to a cutting saw with the glide plate overlay 50 attached over the longitudinal aperture 49 and operating the cutting saw to cut concrete, a slot (not shown) is first formed in the glide plate overlay 50 by the cutting blade. Because the resultant slot is made in the glide plate overlay 50 by the cutting blade of the cutting saw, the gap between the slot and the cutting blade is minimized to produce high-quality cuts.

The glide plate overlay 50 may be attached to glide plate bracket 45 either prior to or after assembling the glide plate bracket 45 to the cutting saw. If the glide plate assembly 40 is to be mounted using mounting screws 17, this may be accomplished by inserting the screws 17 through locking holes 39 and mounting holes 35 which are aligned with mounting holes in the underside of the cutting saw. Alternately, the glide plate bracket 45 may be first assembled to the underside of the cutting saw and the glide plate overlay 50 slid into the longitudinal aperture 49 until the locking holes 39 are slid over the heads of screws 17.

Figure 11:
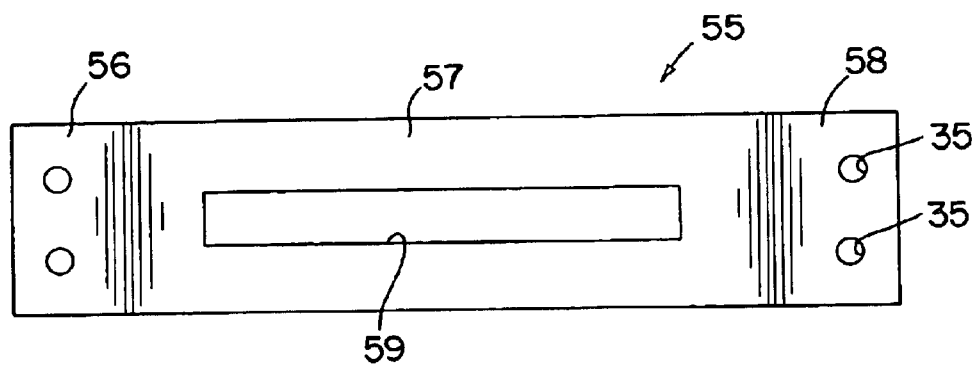
FIG. 11 is a top view of a glide plate bracket according to an alternate embodiment of the present invention.
Figure 12:
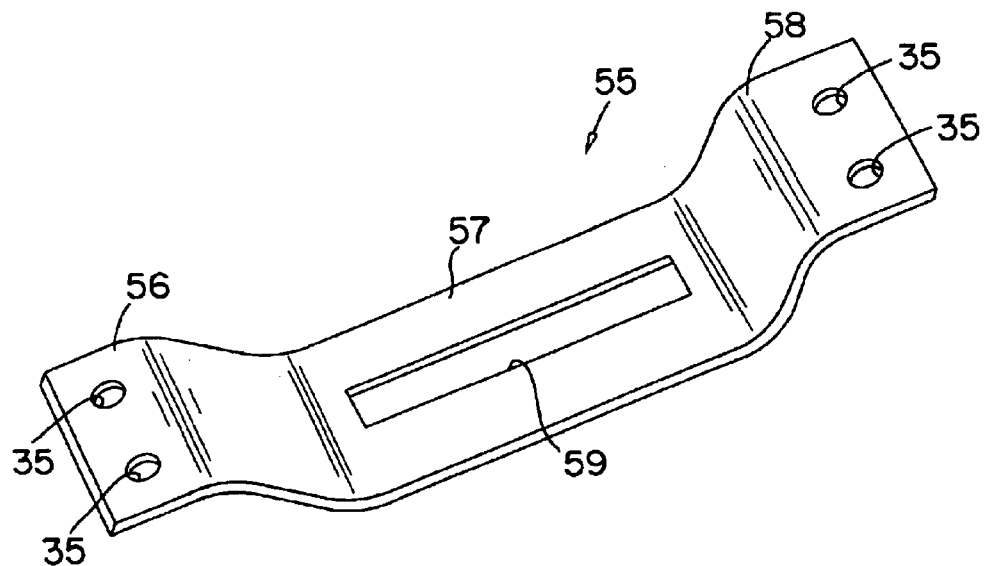
FIG. 12 is an elevated perspective view of the glide plate bracket of FIG. 11.
Figure 13:
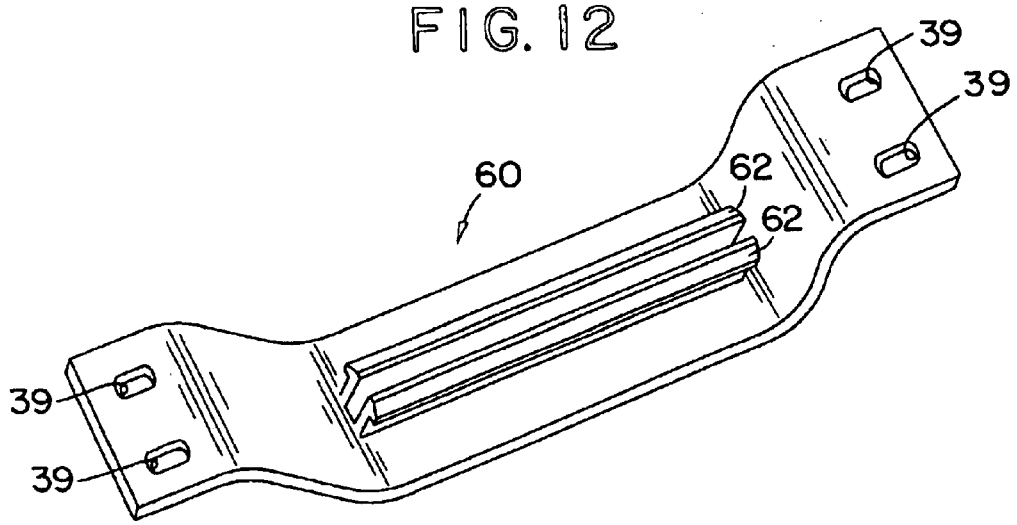
FIG. 13 is an elevated perspective view of a glide plate overlay according to an alternate embodiment of the present invention.
Figure 14:
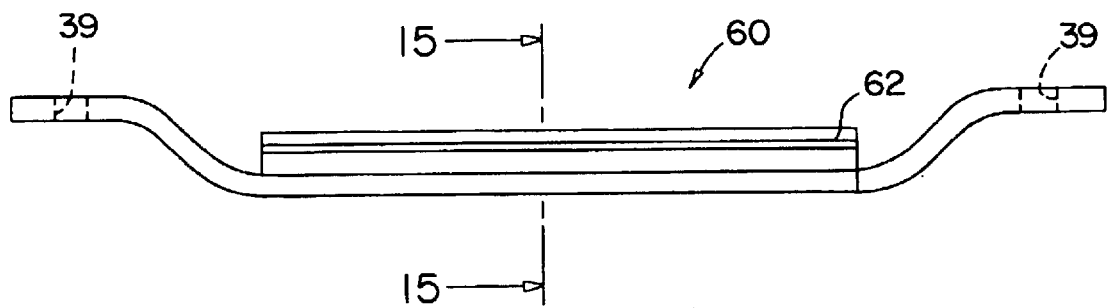
FIG. 14 is a side elevational view of the glide plate overlay of FIG. 13.
Figure 15:
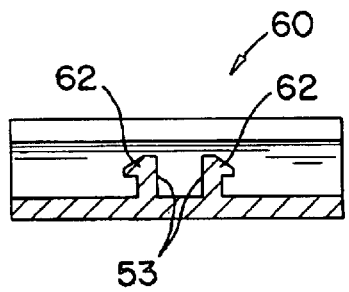
FIG. 15 is a sectional view taken along the sectional line "15—15" in FIG. 14.
Figure 20:
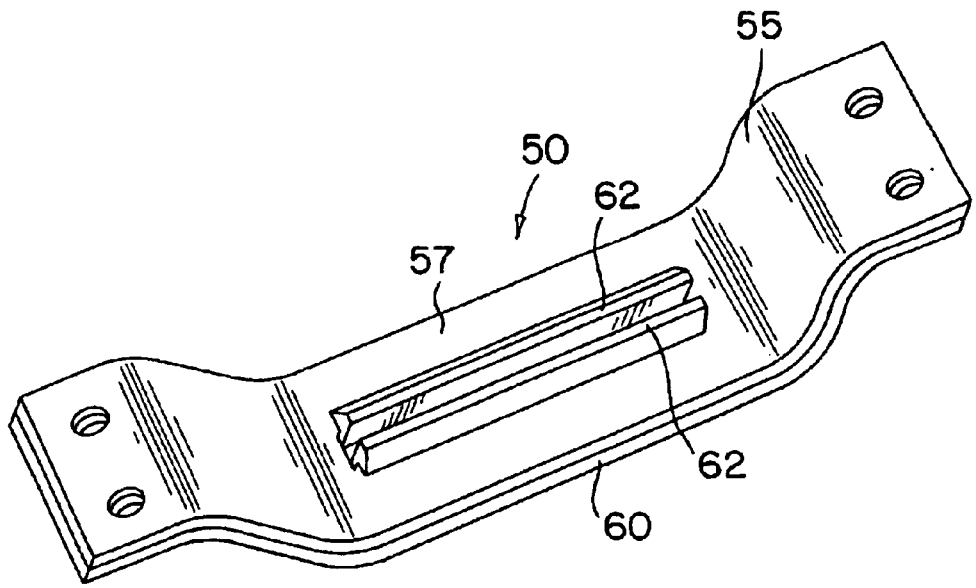
FIG. 20 is an elevated perspective view of an assembled glide plate assembly including the glide plate bracket of FIG. 12 and the glide plate overlay of FIG. 13.

Shown in FIG. 20 is a glide plate assembly 50 for a cutting saw having a cutting blade according to another embodiment of the present invention. The component parts of glide plate assembly 50 are shown in FIGS. 11–15 and include a glide plate bracket 55 that is similar to glide plate bracket 45 in that it includes a substantially planar portion 57 located between two mounting portions 56, 58 but includes only one aperture, longitudinal aperture 59 as shown in FIGS. 11 and 12. A glide plate overlay 60 shown in FIGS. 13–15 is similar to glide plate overlay 50 except that outwardly-facing longitudinal flanges 62 are configured for insertion into the longitudinal aperture 59 orthogonally to the plane of the longitudinal aperture 59. Preferably, chamfered flanges, seen best in FIG. 15, are provided for facilitating insertion into the longitudinal aperture 59. Additionally, glide plate overlay 60 preferably includes two curved portions having locking holes 39 as shown in FIGS. 13 and 14.

Figure 16:
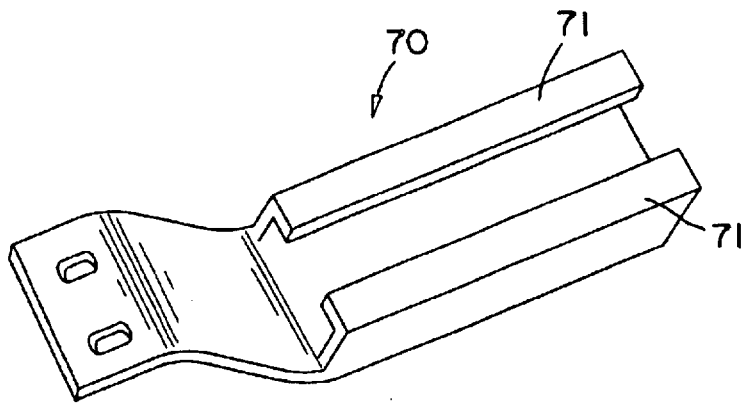
FIG. 16 is an elevated perspective view of a glide plate overlay according to an another alternate embodiment of the present invention.

In yet another embodiment shown in FIG. 16 is a glide plate overlay 70 having a wear surface and an attachment surface, the attachment surface having inwardly-facing flanges 71 configured for attachment to outer edges of a glide plate bracket. The glide plate overlay 70 is slid over the glide plate bracket in similar fashion to that described above for glide plate overlay 50 except that the inwardly-facing flanges 71 slide along and engage the outer edges of the glide plate bracket.

The glide plate overlays according to the present invention are fabricated from materials that are penetrable by the cutting blade of a saw to which the overlay is to be attached to form a slot that maintains a tight-tolerance with the cutting blade. Preferably, a wear-resistant material that is dimensioned to sufficiently cover the glide plate bracket is used to prevent the glide bracket from contacting a concrete surface to be cut by the cutting saw, thereby reducing abrasion of both the glide plate overlay and the concrete surface being cut. Ultra-high molecular weight polymers are preferred with polytetrafluoroethylene (PTFE), available from E. I. Du Pont de Nemours and Company, Wilmington, Del., being most preferred as this material has a relatively low coefficient of friction and is capable of being manufactured into the overlay shapes shown and described using hot-forming processes such as extrusion.

In the various embodiments shown and described above, the glide plate overlay is formed to follow all or part of the contour of a glide plate bracket having two curved mounting portions with a substantially planar portion located therebetween. The glide plate bracket is preferably made of a rigid material such as steel and can be either manufactured new from sheet stock material or by retrofitting a conventional skid plate like those shown in FIGS. 1–4 and described above. According to the present invention, a retrofit method for manufacturing a glide plate assembly is also provided that permits the use or reuse of a disposable skid plate to form a glide plate bracket into which a disposable wear-resistant glide plate overlay is attached. The retrofit method permits a skid plate to be used repeatedly by replacing only the relatively inexpensive glide plate overlay when worn. Moreover, because of the lower replacement cost of the glide plate overlay, it can be changed with greater frequency to achieve high-quality cuts while remaining cost-effective.

Such a retrofit method for manufacturing a glide plate assembly includes the steps of providing a skid plate of a concrete cutting saw, the skid plate having a planar portion with a longitudinal cutting slot dimensioned for a cutting blade. A glide plate overlay made of a material penetrable by the cutting blade and configured for attachment over the longitudinal cutting slot in the skid plate is then provided and attached over the longitudinal cutting slot of the skid plate. The cutting saw having the skid plate with the glide plate overlay attached over the longitudinal cutting slot is then operated to form a slot in the glide plate overlay by the cutting blade.

Although a wear-resistant material such as a sheet of the ultra-high molecular weight polymer as described above may be adhered to the bottom of the saw to form the glide plate, preferably, the retrofit method incorporates the use of the glide plate overlays 50, 60, or 70 shown and described above to facilitate changing out of the overlays once they become worn. In the event that glide plate overlays 50 or 60 are to be utilized, the retrofit method further includes the step of enlarging the cutting slot of the skid plate to form an aperture dimensioned to accept the longitudinal flanges located on the glide plate overlays. For example, in the case of a ⅛-inch width skid plate cutting slot, the slot may be enlarged to a ⅜-inch wide longitudinal aperture. Additionally, when using the glide plate overlay 50, the step of providing an aperture in one of the mounting portions, is needed to permit the at least one inner flange to be inserted into the longitudinal aperture and slid along the substantially planar portion.

Thus according to the present invention, glide plate assemblies shown and described above are provided that may be attached to a cutting saw for receiving an unslotted glide plate overlay that, preferably, is made of a low-abrasive, wear-resistant material that can be replaced as often as desired without the need for removing the entire assembly.

Figure 17:
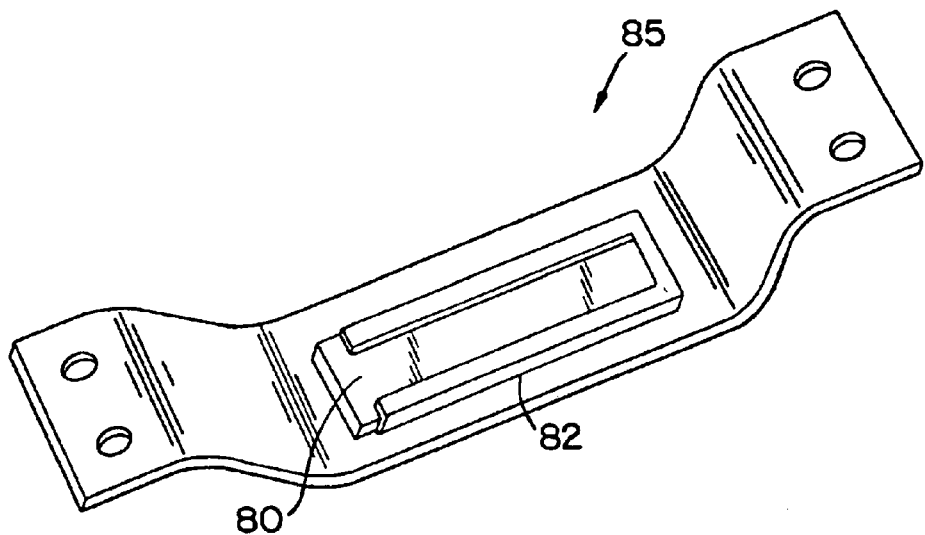
FIG. 17 is an elevated perspective view of a glide plate assembly according to an another alternate embodiment of the present invention.

Although preferred embodiments of the glide plate assemblies are shown and described above as having a removable glide plate overlay formed to follow all or part of the contour of a glide plate bracket, it will be readily recognized that other modifications may be made. For example, the glide plate overlays could be permanently fastened to the glide plate brackets, such as by an adhesive. However, replacement of the glide plate overlay would then require the worn overlay to be removed with difficulty before a new overlay could be used. Also, other methods for attaching the glide plate overlay to a glide plate bracket could also be employed. Such an alternative example is shown in FIG. 17 in which a flanged frame 82 is provided on a glide plate bracket 85 into which a glide plate overlay 80 is inserted as shown.

Figure 18:
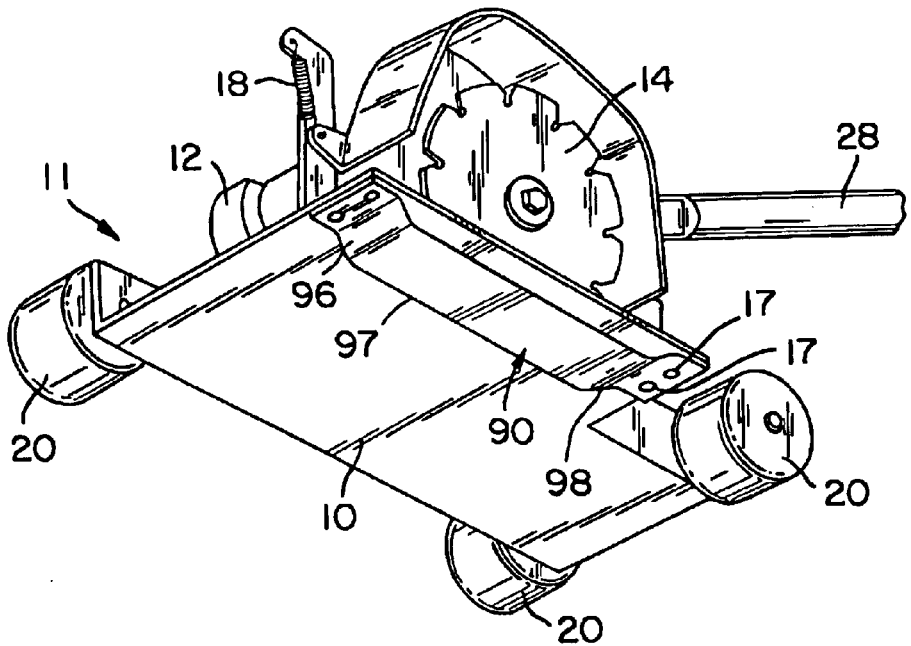
FIG. 18 is a lower perspective view of a cutting saw showing the motor and blade in a raised position with a glide plate overlay according to another alternate embodiment of the present invention.

Additionally, although the glide plate assemblies are shown and described above as having a glide plate bracket onto which a glide plate overlay is positioned, it is envisioned that a replaceable glide plate overlay could also be provided as the entire glide plate assembly. Shown in FIG. 18 is a glide plate overlay 90 for attachment to the underside of a cutting saw having a cutting blade that preferably has a substantially planar portion 97 disposed between two mounting portions 96 and 98, the mounting portions being configured to secure and position the glide plate overlay over a cutting slot located on the underside of the cutting saw. The glide plate overlay 90 is removably attached to the saw and made entirely of a material penetrable by the cutting blade such that upon attaching the glide plate overlay over the cutting slot of the cutting saw and operating the cutting saw, a slot is formed in the glide plate overlay by the cutting blade. Preferably, the glide plate overlay 90 is made of materials including those described above with an ultra-high molecular weight polymer such as polytetrafluoroethylene being most preferred.

Thus, a glide plate overlay and a glide plate assembly for a cutting saw and retrofit method for manufacturing the assembly are disclosed that provide many advantages when used with cutting saws. Among these advantages are that glide plate overlay replacements are fast and easy to perform. When worn, the glide plate overlays may simply be slid off and replaced without disassembling the glide plate bracket from the saw. Additionally, the lower coefficient of friction of the materials used for the glide plate overlays reduces the abrasion of and drag marks left on green concrete that is cut. Furthermore, because the cutting blade cuts through the glide plate overlay to form a negligible clearance slot with the cutting blade, higher quality saw cuts can be obtained while also extending the life of the sawblades.

While embodiments and applications of this invention have been shown and described, it will be apparent to those skilled in the art that many more modifications are possible without departing from the inventive concepts herein described. For example, although shown and described above being preferably used in conjunction with a saw having an upward cutting blade, it is to be understood that the glide plate overlay and glide plate assembly according to the present invention may be used with cutting blades regardless of their direction of rotation. Additionally, although shown and described as being used with a concrete cutting saw attached to an elongated handle, the glide plate overlay and glide plate assembly according to the present invention may also be attached to a walk-behind cutting saw. It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A glide plate assembly for a cutting saw having a cutting blade, comprising:
   a glide plate bracket having a substantially planar portion with a longitudinal aperture located therein, the glide plate bracket being attachable to a cutting saw, and
   a glide plate overlay made of a material penetrable by the cutting blade and configured for attachment over the aperture in the glide plate bracket,
   such that upon attaching the glide plate bracket to the cutting saw with the glide plate overlay attached over the aperture and operating the cutting saw, a slot is formed in the glide plate overlay by the cutting blade.

2. The glide plate assembly for a cutting saw according to claim 1, wherein the glide plate overlay has a wear surface and an attachment surface, the attachment surface comprising at least one inner flange configured for attachment to the longitudinal aperture of the glide plate bracket.

3. The glide plate assembly for a cutting saw according to claim 2, wherein the at least one inner flange is two outwardly-facing longitudinal flanges configured to engage the longitudinal aperture of the glide plate bracket.

4. The glide plate assembly for a cutting saw according to claim 3, wherein the longitudinal outwardly-facing longitudinal flanges are configured for insertion along the longitudinal aperture.

5. The glide plate assembly for a cutting saw according to claim 3, wherein the longitudinal outwardly-facing longitudinal flanges are configured for insertion orthogonally into the longitudinal aperture.

6. A glide plate assembly for a cutting saw having a cutting blade, comprising:
   a glide plate bracket having a substantially planar portion with a longitudinal aperture located therein, the glide plate bracket being attachable to a cutting saw, and
   a glide plate overlay made of a material penetrable by the cutting blade and having a wear surface and an attachment surface, the attachment surface comprising inwardly-facing flanges configured for attachment to outer edges of the glide plate bracket,
   such that upon attaching the glide plate bracket to the cutting saw with the glide plate overlay attached over the aperture and operating the cutting saw, a slot is formed in the glide plate overlay by the cutting blade.

7. A glide plate assembly for a cutting saw having a cutting blade, comprising:

a glide plate bracket being attachable to a cutting saw and having a substantially planar portion, the substantially planar portion of the glide plate bracket having a longitudinal aperture located therein and being attached to two mounting portions configured to secure the glide plate bracket to the cutting saw, the mounting portions being configured so that the substantially planar portion depends from the two mounting portions a distance sufficient to place the glide plate overlay covering the substantially planar portion in contact with a concrete surface to be cut by the cutting saw, and a glide plate overlay made of a material penetrable by the cutting blade and configured for attachment over the aperture in the glide plate bracket, such that upon attaching the glide plate bracket to the cutting saw with the glide plate overlay attached over the aperture and operating the cutting saw, a slot is formed in the glide plate overlay by the cutting blade.

8. The glide plate assembly for a cutting saw according to claim 7, wherein the glide plate overlay has a wear surface and an attachment surface, the attachment surface comprising at least one inner flange configured for attachment to the longitudinal aperture of the glide plate bracket, and one of the mounting portions of the glide plate bracket further comprises an aperture configured to permit the at least one inner flange to be inserted into the longitudinal aperture and slid along the substantially planar portion.

9. A glide plate assembly for a cutting saw having a cutting blade, comprising:

a glide plate bracket having a substantially planar portion with a longitudinal aperture located therein, the glide plate bracket being attachable to a cutting saw, and a glide plate overlay made of a wear resistant material penetrable by the cutting blade, the glide plate overlay being configured for attachment over the aperture in the glide plate bracket and is dimensioned to sufficiently cover the glide plate bracket to prevent the glide bracket from contacting a concrete surface to be cut by the cutting saw, such that upon attaching the glide plate bracket to the cutting saw with the glide plate overlay attached over the aperture and operating the cutting saw, a slot is formed in the glide plate overlay by the cutting blade.

10. A glide plate assembly for a cutting saw having a cutting blade, comprising:

a glide plate bracket having a substantially planar portion with a longitudinal aperture located therein, the glide plate bracket being attachable to a cutting saw, and a glide plate overlay made of an ultra-high molecular weight polymer and configured for attachment over the aperture in the glide plate bracket, such that upon attaching the glide plate bracket to the cutting saw with the glide plate overlay attached over the aperture and operating the cutting saw, a slot is formed in the glide plate overlay by the cutting blade.

11. A glide plate assembly for a cutting saw having a cutting blade, comprising:

a glide plate bracket having a substantially planar portion with a longitudinal aperture located therein, the glide plate bracket being attachable to a cutting saw, and a glide plate overlay made of polytetrafluoroethylene and configured for attachment over the aperture in the glide plate bracket, such that upon attaching the glide plate bracket to the cutting saw with the glide plate overlay attached over the aperture and operating the cutting saw, a slot is formed in the glide plate overlay by the cutting blade.

12. A retrofit method for manufacturing a glide plate assembly for a cutting saw having a cutting blade, comprising the steps of:

providing a skid plate of a concrete cutting saw, the skid plate having a planar portion with a longitudinal cutting slot dimensioned for a cutting blade, providing a glide plate overlay made of a material penetrable by the cutting blade and configured for attachment over the longitudinal cutting slot in the skid plate, attaching the glide plate overlay over the longitudinal cutting slot of the skid plate, and operating the cutting saw having the skid plate with the glide plate overlay attached over the longitudinal cutting slot so that a slot is formed in the glide plate overlay by the cutting blade.

13. The retrofit method for manufacturing a glide plate assembly according to claim 12, wherein the glide plate overlay has a wear surface and an attachment surface, the attachment surface comprising inwardly-facing flanges configured for attachment to outer edges of the glide plate bracket.

14. The retrofit method for manufacturing a glide plate assembly according to claim 12, further comprising the step of enlarging the cutting slot to form an aperture dimensioned to accept at least one longitudinal flange located on the glide plate overlay, the glide plate overlay being dimensioned for covering the aperture.

15. The retrofit method for manufacturing a glide plate assembly according to claim 14, wherein the glide plate overlay has a wear surface and an attachment surface, the attachment surface comprising at least one inner flange configured for attachment to the longitudinal aperture of the glide plate bracket.

16. The retrofit method for manufacturing a glide plate assembly according to claim 15, wherein the at least one inner flange is two outwardly-facing longitudinal flanges selected from the group consisting of flanges configured for insertion along the longitudinal aperture and flanges configured for insertion orthogonally into the longitudinal aperture.

17. The retrofit method for manufacturing a glide plate assembly according to claim 15, further comprising the step of providing an aperture in one of the mounting portions, the aperture configured to permit the at least one inner flange to be inserted into the longitudinal aperture and slid along the substantially planar portion.

18. A glide plate overlay for attachment to the underside of a cutting saw having a cutting blade, comprising:

a substantially planar portion disposed between two mounting portions, the mounting portions being configured to secure and position the glide plate overlay over a cutting slot located on the underside of the cutting saw, the glide plate overlay being made of a material penetrable by the cutting blade such that upon attaching the glide plate overlay over the cutting slot of the cutting saw and operating the cutting saw, a slot is formed in the glide plate overlay by the cutting blade.

19. A glide plate overlay for attachment to the underside of a cutting saw having a cutting blade, comprising:

a substantially planar portion disposed between two mounting portions, the mounting portions being configured to secure and position the glide plate overlay over a cutting slot located on the underside of the cutting saw, the glide plate overlay being made of an ultra-high molecular weight polymer such that upon attaching the glide plate overlay over the cutting slot of the cutting saw and operating the cutting saw, a slot is formed in the glide plate overlay by the cutting blade.

20. A glide plate overlay for attachment to the underside of a cutting saw having a cutting blade, comprising:

a substantially planar portion disposed between two mounting portions, the mounting portions being configured to secure and Position the glide plate overlay over a cutting slot located on the underside of the cutting saw, the glide plate overlay being made of polytetrafluoroethylene such that upon attaching the glide plate overlay over the cutting slot of the cutting saw and operating the cutting saw, a slot is formed in the glide plate overlay by the cutting blade.

* * * * *

UNITED STATES PATENT AND TRADEMARK OFFICE
CERTIFICATE OF CORRECTION

PATENT NO.    : 6,736,126 B2
DATED         : May 18, 2004
INVENTOR(S)   : Michael G. Schroer and Mark G. Schroer It is certified that error appears in the above-identified patent and that said Letters Patent is hereby corrected as shown below:

Column 3,
Line 27, after "glide plate", second occurrence, delete "b" and "racket" and insert -- bracket --.

Column 9,
Line 41, after "and", delete "is".

Column 12,
Line 3, after "and", delete "Position", and insert -- position --.

Signed and Sealed this

Thirteenth Day of July, 2004

JON W. DUDAS
*Acting Director of the United States Patent and Trademark Office*

(12) EX PARTE REEXAMINATION CERTIFICATE (7135th)
United States Patent
Schroer et al.

(10) Number: US 6,736,126 C1
(45) Certificate Issued: Nov. 3, 2009

(54) GLIDE PLATE OVERLAY AND GLIDE PLATE ASSEMBLY FOR A CUTTING SAW AND RETROFIT METHOD FOR MANUFACTURING SAME

(76) Inventors: Michael G. Schroer, 115 Quaker Dr., Bethlehem, PA (US) 18020; Mark G. Schroer, 7826 Campbell, Kansas City, MO (US) 64131

Reexamination Request:
No. 90/008,318, Dec. 27, 2006

Reexamination Certificate for:
Patent No.: 6,736,126
Issued: May 18, 2004
Appl. No.: 10/125,140
Filed: Apr. 18, 2002

Certificate of Correction issued Jul. 13, 2004.

(51) Int. Cl.
*B28D 01/04* (2006.01)

(52) U.S. Cl. ........................................ 125/13.01; 125/14
(58) Field of Classification Search ................ 125/13.01, 125/14
See application file for complete search history.

(56) References Cited

U.S. PATENT DOCUMENTS

| | | |
|---|---|---|
| 2,854,043 A | 9/1958 | Raymond |
| 3,303,861 A | 2/1967 | Kane |
| 4,075,920 A | 2/1978 | Neal |
| 4,334,356 A | 6/1982 | Krosunger |
| 4,889,675 A | 12/1989 | Chiuminatta et al. |
| 4,928,662 A | 5/1990 | Chiuminatta et al. |
| 5,858,527 A * | 1/1999 | Lee et al. ..................... 428/327 |
| 5,924,270 A * | 7/1999 | Bruns ......................... 56/320.1 |

OTHER PUBLICATIONS

N–E–D Corporation, ned–kut Diamond Products, Instructions for Shield Protector Installation, p. 1, rev8292.

* cited by examiner

*Primary Examiner*—Jimmy G Foster

(57) ABSTRACT

A glide plate assembly for a cutting saw having a cutting blade, including a glide plate bracket attachable to a cutting saw and having a substantially planar portion with a longitudinal aperture located therein. A glide plate overlay made of a material penetrable by the cutting blade is configured for attachment over the aperture in the glide plate bracket, such that upon attaching the glide plate bracket to the cutting saw with the glide plate overlay attached over the aperture and operating the cutting saw, a slot is formed in the glide plate overlay by the cutting blade. A glide plate overlay for attachment to the underside of a cutting saw having a cutting blade is also provided that includes a substantially planar portion disposed between two mounting portions, the mounting portions being configured to secure and position the glide plate overlay over a cutting slot located on the underside of the cutting saw. A retrofit method is also provided for manufacturing a glide plate assembly for a cutting saw having a cutting blade. The retrofit method includes the steps of providing a skid plate of a concrete cutting saw, the skid plate having a planar portion with a longitudinal cutting slot dimensioned for a cutting blade. A glide plate overlay is provided and attached over the longitudinal cutting slot of the skid plate. The cutting saw is then operated so that a slot is formed in the glide plate overlay by the cutting blade.

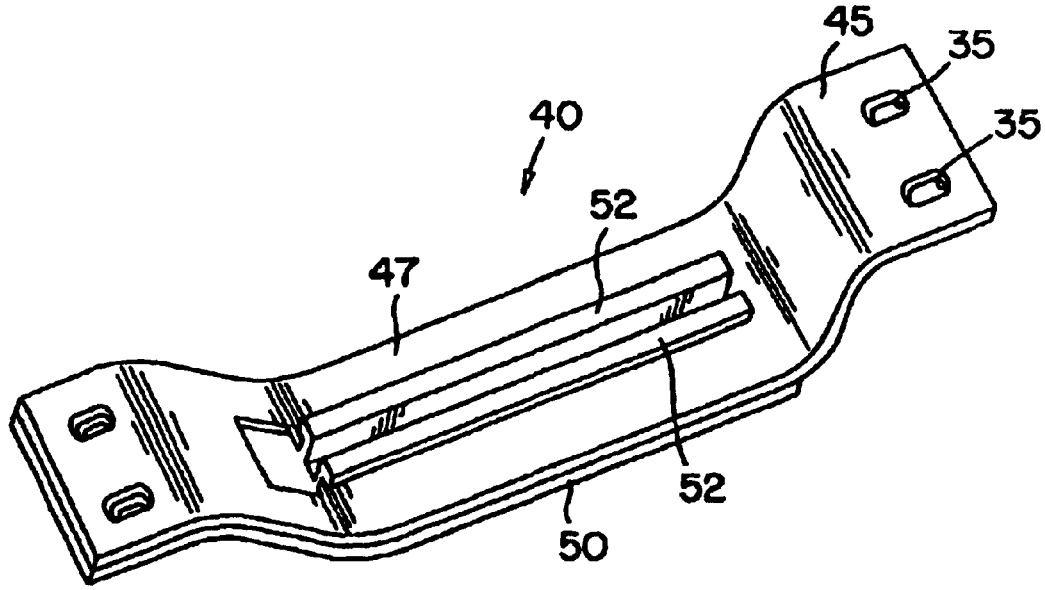

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6–8 and 12–17 is confirmed.

Claims 1, 9–11 and 18–20 are cancelled.

Claim 2 is determined to be patentable as amended.

Claims 3–5, dependent on an amended claim, are determined to be patentable.

2. [The glide plate assembly for a cutting saw according to claim 1.] *A glide plate assembly for a cutting saw having a cutting blade, comprising:*
   *a glide plate bracket having a substantially planar portion with a longitudinal aperture located therein, the glide plate bracket being attachable to a cutting saw, and*
   *a glide plate overlay made of a material penetrable by the cutting blade and configured for attachment over the aperture in the glide plate bracket,*
   *such that upon attaching the glide plate bracket to the cutting saw with the glide plate overlay attached over the aperture and operating the cutting saw, a slot is formed in the glide plate overlay by the cutting blade.*
   wherein the glide plate overlay has a wear surface and an attachment surface, the attachment surface comprising at least one inner flange configured for attachment to the longitudinal aperture of the glide plate bracket.

* * * * *